United States Patent
Washizawa

(10) Patent No.: US 8,421,935 B2
(45) Date of Patent: Apr. 16, 2013

(54) METHOD FOR MANUFACTURING LIQUID CRYSTAL DISPLAY DEVICE

(75) Inventor: Takehito Washizawa, Tottori (JP)

(73) Assignee: Sony Corporation, Tokyo (JP)

( * ) Notice: Subject to any disclaimer, the term of this patent is extended or adjusted under 35 U.S.C. 154(b) by 262 days.

(21) Appl. No.: 12/913,268

(22) Filed: Oct. 27, 2010

(65) Prior Publication Data

US 2011/0102732 A1     May 5, 2011

(30) Foreign Application Priority Data

Nov. 3, 2009   (JP) ................. P2009-252508

(51) Int. Cl.
G02F 1/1335    (2006.01)

(52) U.S. Cl.
USPC ............................................. 349/15

(58) Field of Classification Search .......... 349/12, 349/15
See application file for complete search history.

(56) References Cited

U.S. PATENT DOCUMENTS

| 5,729,319 | A * | 3/1998 | Inou et al. ............. 349/156 |
| 6,046,787 | A * | 4/2000 | Nishiguchi ............ 349/129 |
| 2004/0119896 | A1 | 6/2004 | Kean et al. |

FOREIGN PATENT DOCUMENTS

JP    2004-206089    7/2004

* cited by examiner

Primary Examiner — James Dudek
(74) Attorney, Agent, or Firm — K&L Gates LLP

(57) ABSTRACT

A method for manufacturing a liquid crystal display device includes the steps of combining a first substrate and a second substrate between which a liquid crystal layer is to be held, and forming a functional member directly on a surface of the first substrate opposite to the side holding the liquid crystal layer.

12 Claims, 16 Drawing Sheets

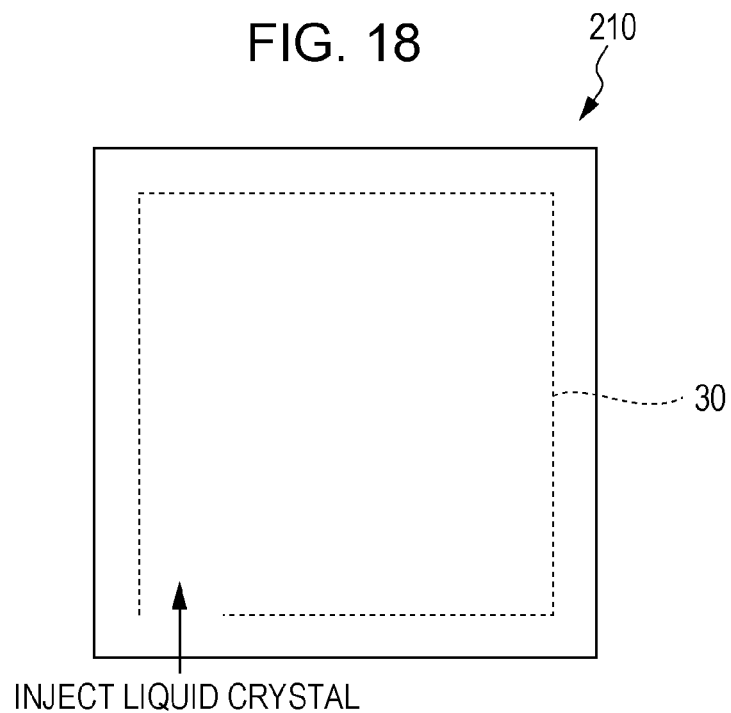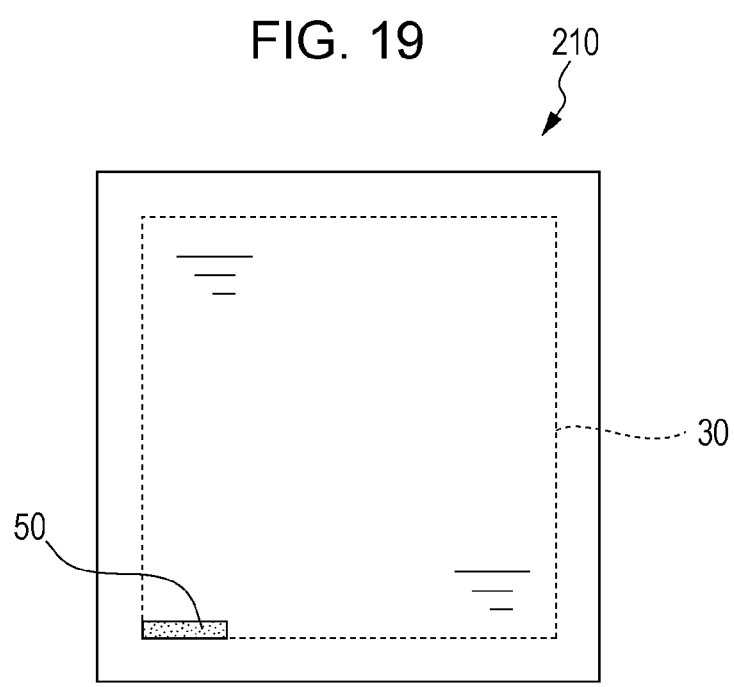

METHOD FOR MANUFACTURING LIQUID CRYSTAL DISPLAY DEVICE

CROSS REFERENCES TO RELATED APPLICATIONS

The present application claims priority to Japanese Priority Patent Application JP 2009-252508 filed in the Japan Patent Office on Nov. 3, 2009, the entire contents of which are hereby incorporated by reference.

BACKGROUND

The present application relates to methods for manufacturing a liquid crystal display device, and particularly to a method including the step of combining a pair of substrates to hold a liquid crystal layer therebetween.

For example, Japanese Unexamined Patent Application Publication No. 2004-206089 discloses a method for manufacturing a liquid crystal display device including the step of combining a pair of substrates to hold a liquid crystal layer therebetween.

In Japanese Unexamined Patent Application Publication No. 2004-206089, a liquid crystal display device is disclosed which includes a TFT substrate having thin film transistors (TFTs), a counter substrate (color filter (CF) substrate) opposing the TFT substrate, and a liquid crystal layer disposed between the TFT substrate and the counter substrate. A polarizer is disposed on the surface of the counter substrate opposite to the liquid crystal layer. Furthermore, a parallax barrier is disposed for displaying a three-dimensional (3-D) image or two different images on the surface of the polarizer opposite to the counter substrate. The parallax barrier includes a parallax barrier substrate and a parallax barrier aperture array (parallax barrier pattern) having a plurality of slits therein and disposed on the surface of the parallax barrier substrate. Although it is not clearly described in Japanese Unexamined Patent Application Publication No. 2004-206089, the polarizer and the parallax barrier aperture array may be bonded together with an adhesive layer therebetween.

SUMMARY

In this liquid crystal display device, however, when the polarizer and the parallax barrier aperture array are bonded together with an adhesive layer therebetween, foreign matter can be trapped between the polarizer and the parallax barrier aperture array. Consequently, the yield of the liquid crystal display device can be undesirably reduced.

Accordingly, it is desirable to provide a method for manufacturing a liquid crystal display device preventing the reduction in yield.

According to an embodiment, there is provided a method for manufacturing a liquid crystal display device including the steps of combining a first substrate and a second substrate between which a liquid crystal layer is to be held, and forming a functional member directly on a surface of the first substrate opposite to the side holding the liquid crystal layer.

By forming the functional member directly on the surface of one of the substrates opposite to the side holding the liquid crystal layer, foreign matter can be prevented from being trapped between the substrate and the functional member, unlike the case where the functional member is bonded to the surface of the substrate with an adhesive layer therebetween. Consequently, the reduction of the yield of the liquid crystal display device can be prevented.

Preferably, the functional member includes a parallax barrier pattern or a touch panel pattern, and the parallax barrier pattern or the touch panel pattern is formed directly on the surface of the first substrate opposite to the side holding the liquid crystal layer. This structure can prevent foreign matter from being trapped between the substrate and the parallax barrier pattern or the touch panel pattern, unlike the case where the parallax barrier pattern or the touch panel pattern is bonded to the surface of the substrate with an adhesive layer therebetween. Consequently, the reduction of the yield of the liquid crystal display device can be prevented.

Preferably, the method further includes the step of dropping a liquid crystal onto one of the substrates before the step of forming the functional member. Since the liquid crystal fills the space between the substrates by this step, air is not trapped between the substrates. Consequently, even if the substrates are placed in a vacuum or at a high temperature in the step of forming the functional member, the substrates are not ruptured by air expanded between the substrates.

Preferably, the method further includes the step of reducing the thickness of the first substrate before the step of forming the functional member. Thus the functional member can be formed directly on the surface of the first substrate whose thickness has been reduced to a desired level.

When the method includes the step of reducing the thickness, preferably, the method further includes the step of dropping a liquid crystal onto one of the substrates before the step of reducing the thickness. Thus the thickness of the first substrate can be easily reduced with the liquid crystal filling the space between the first and the second substrate.

In this instance, preferably, the method further includes the steps of forming a color filter on the side of the first substrate holding the liquid crystal layer, and forming a thin film transistor on the side of the second substrate holding the liquid crystal layer. The step of reducing the thickness is performed on the surface of the first substrate opposite to the side holding the liquid crystal layer. Consequently, the functional member can be formed directly on the surface of the thinned first substrate opposite to the side holding the liquid crystal layer. If the functional member includes the parallax barrier pattern, the distance between the parallax barrier pattern and the color filter can be reduced because the parallax barrier pattern is formed directly on the surface of the thinned first substrate having the color filter.

When the method includes the step of reducing the thickness, the method may further include the step of dropping a liquid crystal onto one of the substrates before the steps of reducing the thickness and forming the functional member. Since the liquid crystal fills the space between the substrates by this step, air is not trapped between the substrates. Consequently, even if the substrates are placed in a vacuum or at a high temperature in the step of forming the functional member, the substrates are not ruptured by air expanded between the substrates.

In this instance, the step of combining the first substrate and the second substrate may be performed after the step of dropping the liquid crystal and before the step of reducing the thickness. Thus the substrates can be combined without trapping air between the substrates. Consequently, even if the substrates are placed in a vacuum or at a high temperature in the step of forming the functional member, the substrates are not ruptured by air expanded between the substrates.

When the method includes the step of reducing the thickness, the method may further include the step of injecting a liquid crystal into a space between the first substrate and the second substrate after the steps of reducing the thickness and forming the functional member. Thus the liquid crystal layer can be easily formed between the substrates having the functional member by vacuum injection.

Preferably, the method further includes the steps of forming a protective film on a surface of the functional member, and disposing a polarizer on a surface of the protective film. Since the functional member is covered with the protective film, the functional member can be prevented from coming into direct contact with the polarizer.

Preferably, the functional member is formed by sputtering or vapor deposition. Thus the functional member can be easily formed directly on the surface of the first substrate opposite to the side holding the liquid crystal layer.

In this instance, the functional member is preferably a parallax barrier pattern, and the step of forming the functional member is performed by forming a parallax barrier layer on the surface of the first substrate opposite to the side holding the liquid crystal layer by sputtering or vapor deposition, and patterning the parallax barrier layer into the parallax barrier pattern. Thus the parallax barrier pattern can be easily formed directly on the surface of the first substrate opposite to the side holding the liquid crystal layer.

Additional features and advantages are described herein, and will be apparent from the following Detailed Description and the figures.

BRIEF DESCRIPTION OF THE FIGURES

FIG. 18 is a representation of the step of injecting and sealing a liquid crystal in the manufacturing process of the liquid crystal panel according to the second embodiment;

FIG. 19 is a representation of the step of injecting and sealing in the manufacturing process of the liquid crystal panel according to the second embodiment;

DETAILED DESCRIPTION

Embodiments of this application will be described below with reference to the drawings.

First Embodiment

A liquid crystal panel 100 according to a first embodiment will now be described with reference to FIGS. 1 to 3. The liquid crystal panel 100 is one form of the liquid crystal display device of the present application.

Figure 1:
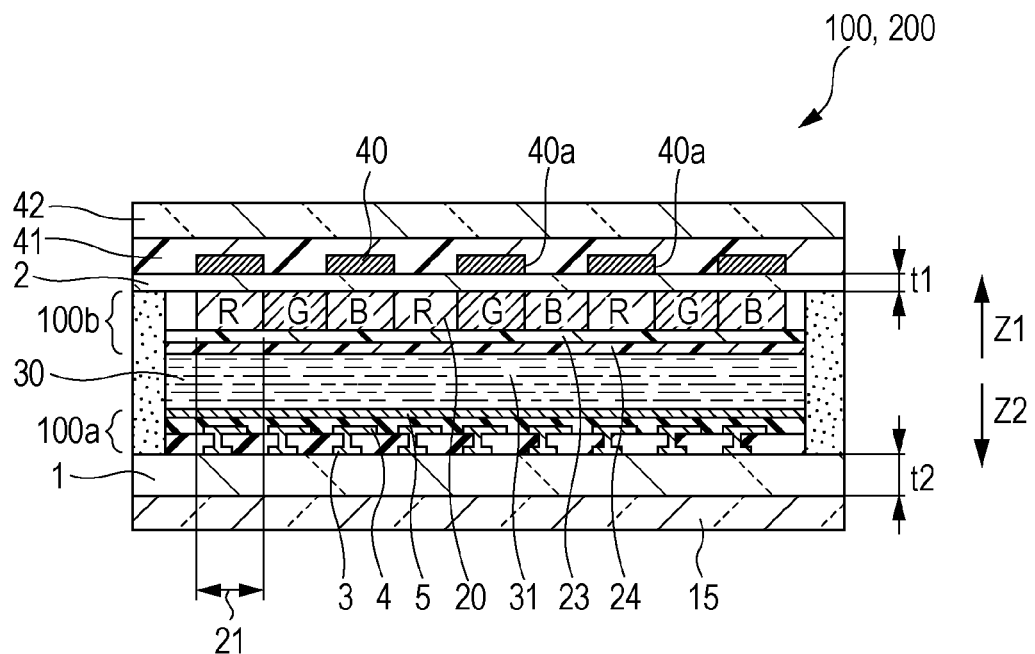
FIG. 1 is a sectional view of a liquid crystal panel having a parallax barrier pattern, according to a first embodiment.
Figure 2:
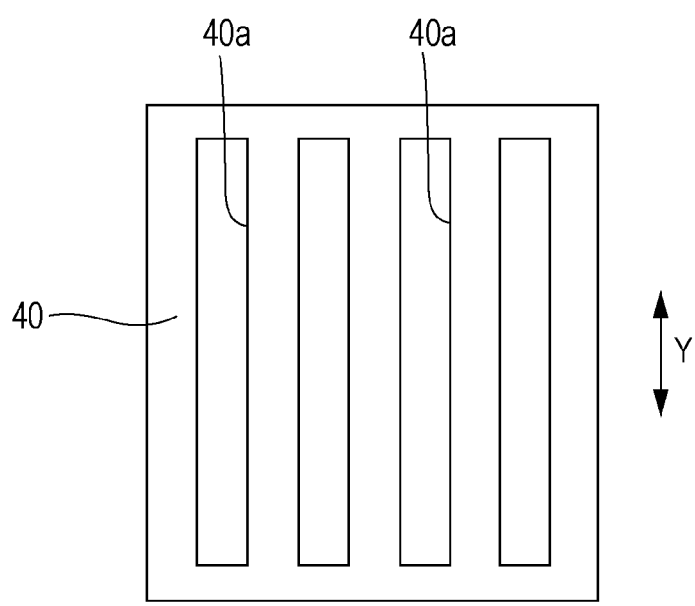
FIG. 2 is a plan view of the parallax barrier pattern shown in FIG. 1.

As shown in FIG. 1, liquid crystal panel 100 of the present embodiment includes a glass TFT substrate 1 and a glass color filter (CF) substrate 2 that oppose each other. In the present embodiment, the CF substrate 2 has a thickness t1 of about 100 μm, and the TFT substrate 1 has a thickness t2 of about 600 μm. Hence, the thickness t1 of the CF substrate 2 is smaller than the thickness t2 of the TFT substrate 1. Consequently, the distance between color filters 20 and a parallax barrier pattern 40 can be small. The TFT substrate 1 is provided with pixel-selecting thin film transistors (TFTs) 3, pixel electrodes 4 and a common electrode 5 on the surface thereof.

Figure 3:
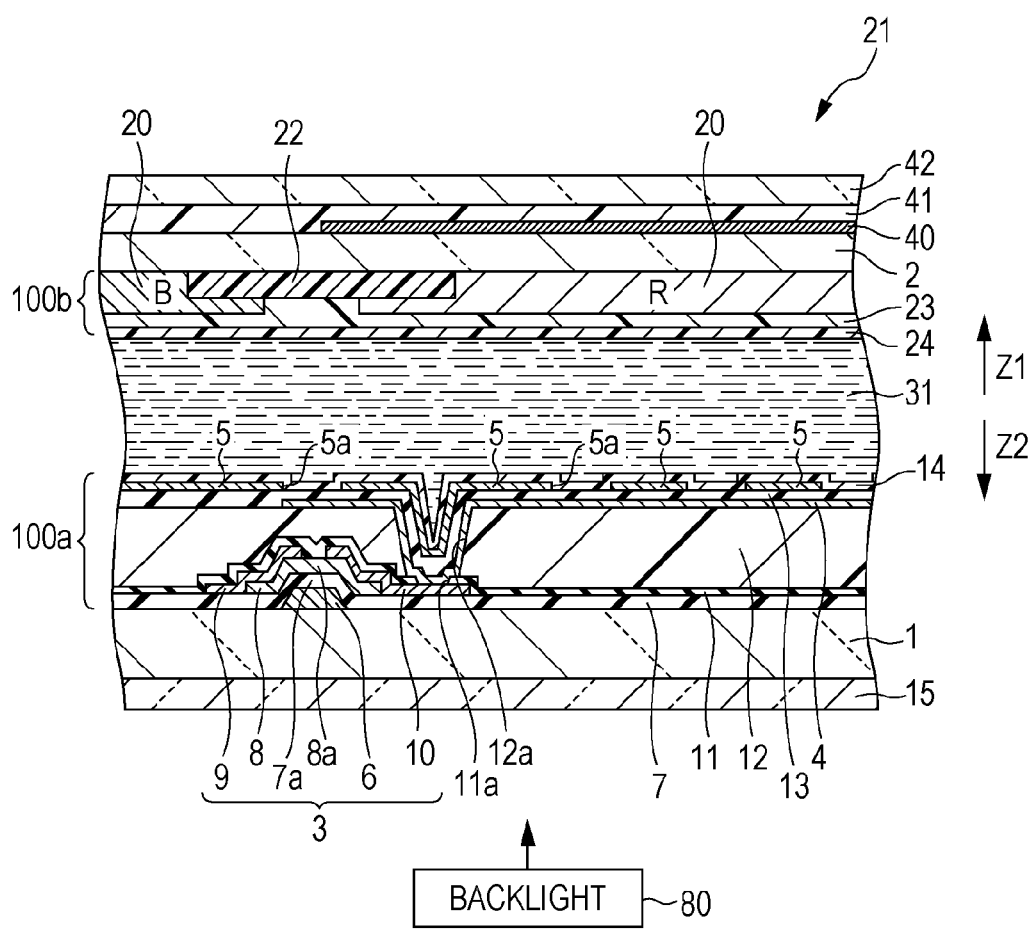
FIG. 3 is a fragmentary sectional view showing a single pixel of the liquid crystal panel.

As shown in FIG. 3 showing a single pixel of the panel in detail, the pixel has a gate electrode 6 on the surface of the TFT substrate 1. The gate electrode 6 and the TFT substrate 1 is covered with an insulating film 7 including a gate insulating film 7a made of SiN or SiO2. A semiconductor layer 8 is disposed over the gate electrode 6 with the gate insulating film 7a therebetween. The semiconductor layer 8 has a double layer structure including a lower a-Si layer and an upper n-type electroconductive n+ Si layer (not shown either).

On the semiconductor layer 8, a source electrode 9 and a drain electrode 10 are formed so as to overlap the gate electrode 6 when viewed from above. The region of the semiconductor layer 8 under the region between the source electrode 9 and the drain electrode 10 acts as a channel region 8a. Thus the pixel-selecting thin film transistor 3 includes the gate electrode 6, the gate insulating film 7a, the semiconductor layer 8, the source electrode 9 and the drain electrode 10.

The source electrode 9, the drain electrode 10 and the insulating film 7 are covered with an insulating interlayer 11 made of, for example, SiN. The insulating interlayer 11 has a contact hole 11a in the region corresponding to the drain electrode 10. A planarizing layer 12 made of an organic material, such as an acrylic resin, is disposed on the surface of the insulating interlayer 11. The planarizing layer 12 has a contact hole 12a therein. On the surface of the planarizing layer 12, a pixel electrode 4 is formed of a transparent material, such as ITO (Indium Tin Oxide) or IZO (Indium Zinc Oxide), and is connected to the drain electrode 10 through the contact holes 11a and 12a.

A passivation layer 13 formed of, for example, SiO2 or SiN at a low temperature is disposed on the surfaces of the planarizing layer 12 and the pixel electrode 4. A common electrode 5 of a transparent material, such as ITO or IZO, is disposed on the surface of the passivation layer 13. The common electrode 5 has a plurality of openings 5a through which an electric field is generated between the pixel electrode 4 and the common electrode 5. An FFS (Fringe Field Switching) liquid crystal panel 100 is thus provided in which the liquid crystal is driven by an electric field in the lateral direction between the pixel electrode 4 and the common electrode 5.

In addition, an alignment layer 14 made of an organic material, such as polyimide, is disposed over the common electrode 5. The alignment layer 14 covers the surface of the common electrode 5, and is in contact with the passivation layer 13 through the openings 5a of the common electrode 5. Furthermore, a polarizer 15 is disposed on the surface in the Z2 direction of the TFT substrate 1. An element-insulating film portion 100a is thus defined by the thin film transistor 3, the insulating interlayer 11, the planarizing layer 12, the pixel electrode 4, the passivation layer 13, the common electrode 5 and the alignment layer 14.

As shown in FIG. 1, red (R), green (G) and blue (B) color filters 20 are disposed on the surface in the Z2 direction of the CF substrate 2. The liquid crystal panel 100 has a plurality of pixels 21, and the color filters 20 are provided for the respective pixels 21.

Referring to FIG. 3 showing the sectional structure of the single pixel, a black matrix 22 made of, for example, a resin is disposed on the surface in the Z2 direction of the CF substrate 2. The black matrix 22 lies in a matrix manner on the boundary between the pixels 21 when viewed from above. The color filter 20 is disposed on the surfaces of the CF substrate 2 and the black matrix 22. The black matrix 22 and the color filter 20 are covered with an overcoat layer 23 acting as a protective film. In addition, an alignment layer 24 of an organic material, such as polyimide, is disposed on the surface of the overcoat layer 23. A resin layer portion 100b is thus defined by the color filter 20, the black matrix 22, the overcoat layer 23 and the alignment layer 24, as shown in FIG. 3.

As shown in FIG. 1, the TFT substrate 1 and the CF substrate 1 are combined with a sealant 30 therebetween, and a liquid crystal layer 31 is enclosed between the TFT substrate 1 and the CF substrate 1.

A backlight 80 is provided to the Z2 direction side of the TFT substrate 1 so as to emit light in the direction from the TFT substrate 1 to the CF substrate 2 (in the Z1 direction).

In the first embodiment, a parallax barrier pattern 40 made of a metal, such as chromium (Cr), aluminum (Al), silver (Ag), or nickel (Ni), is disposed on the surface in the Z1 direction of the CF substrate 2. The parallax barrier pattern 40 is a type of the functional member used in the an embodiment. The parallax barrier pattern 40 has a light-shielding property.

Also, the parallax barrier pattern 40 is disposed directly on the surface in the Z1 direction of the CF substrate 2, as shown in FIG. 1. The parallax barrier pattern 40 has rectangular openings 40a (slits) extending in the Y direction, as shown in FIG. 2. Light is blocked by the portion of the parallax barrier pattern 40 lying between the openings 40a. A protective film 41 made of a transparent resin such as acrylic resin is disposed over the surface in the Z1 direction of the parallax barrier pattern 40, as shown in FIG. 1. In the first embodiment, the surface of the protective film 41 is flat. Furthermore, a polarizer 42 is disposed on the surface in the Z1 direction of the flat protective film 41.

A manufacturing process of the liquid crystal panel 100 according to the first embodiment will now be described with reference to FIG. 1 and FIGS. 4 to 14.

Figure 4:
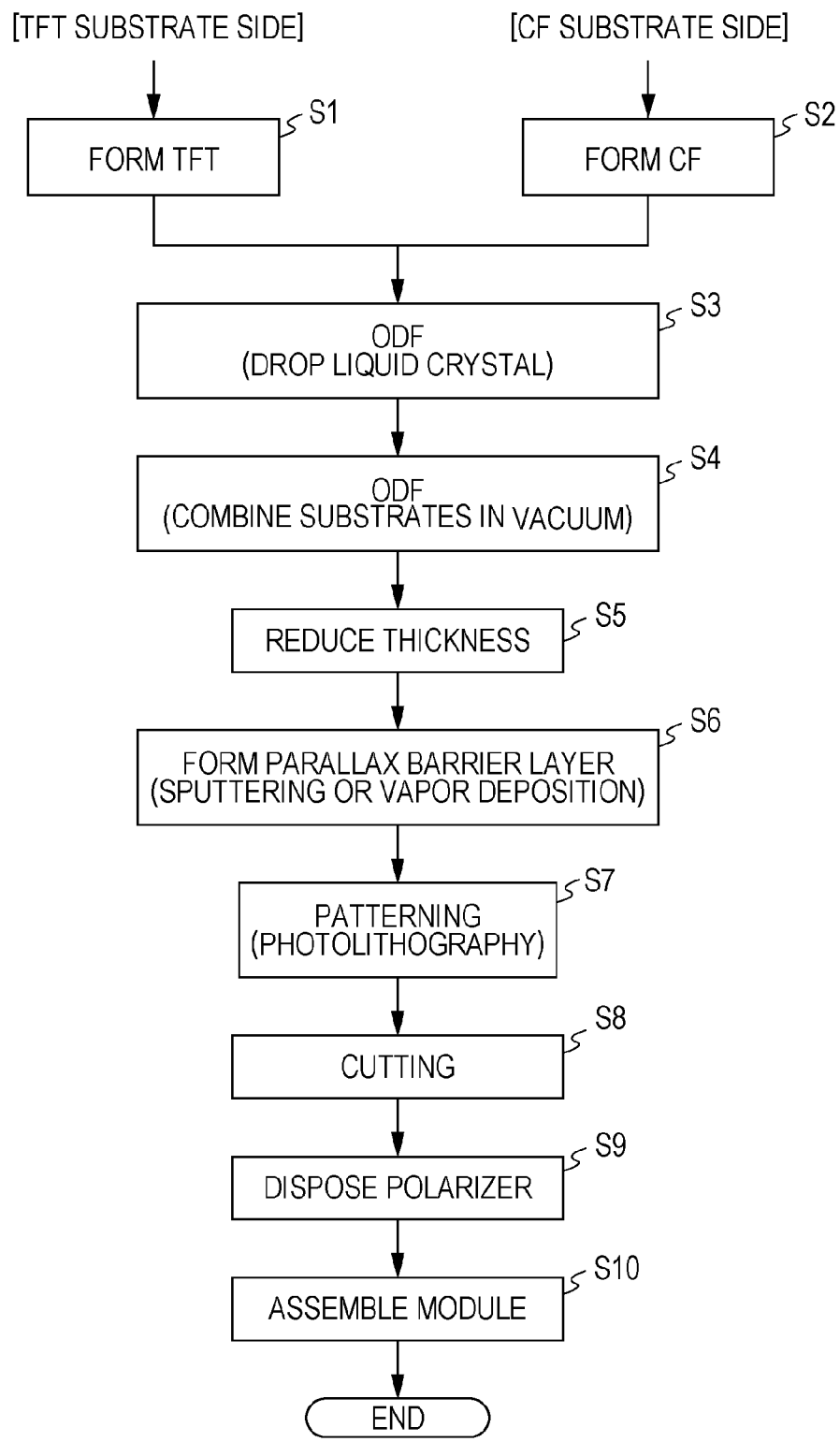
FIG. 4 is a flow chart of a manufacturing process of the liquid crystal panel according to the first embodiment.
Figure 5:
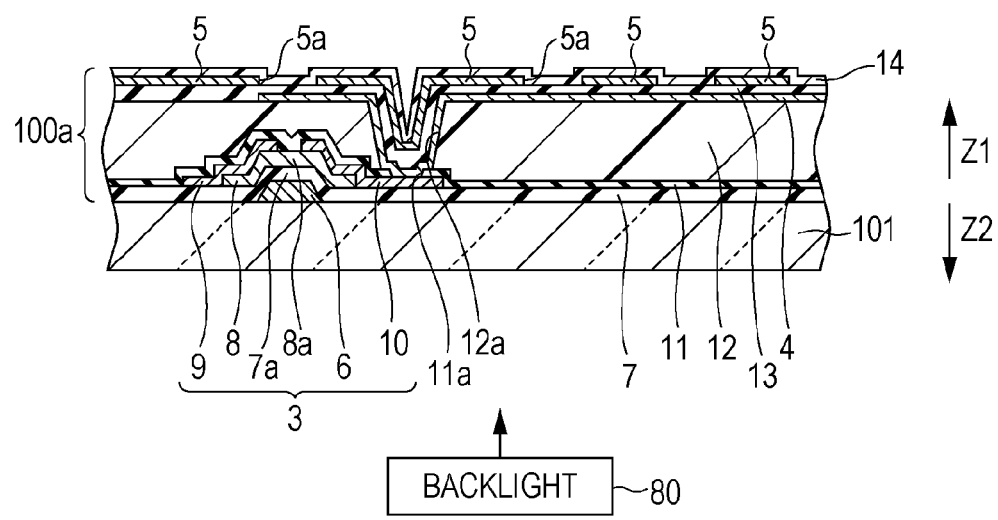
FIG. 5 is a sectional view showing the step of forming TFTs in the manufacturing process of the liquid crystal panel according to the first embodiment.

First, in Step S1 shown in FIG. 4 of forming TFTs, gate electrodes 6 including an Al layer and a Mo layer in that order from below are formed on the surface of a large mother TFT substrate 101 by photolithography and etching, as shown in FIG. 5. An insulating film 7 including a SiN gate insulating film 7a is formed on the gate electrodes 6 and the mother TFT substrate 101 by chemical vapor deposition (CVD). Then, a semiconductor layer 8 having a double layer structure including an a-Si layer and an n-type n+ a-Si layer is formed over each gate electrode 6 with the gate insulating film 7a therebetween by photolithography.

Subsequently, a source electrode 9 and a drain electrode 10 are formed on the semiconductor layer 8 by depositing a Mo layer, an Al layer and a Mo layer in that order from below. The source electrode 9 and the drain electrode 10 overlap with the gate electrode 6 and the semiconductor layer 8 when viewed from above, and are electrically connected to the semiconductor layer 8. Thus thin layer transistors 3 are formed.

Subsequently, a SiN insulating interlayer 11 acting as a protective film is formed by CVD to cover the source electrode 9, the drain electrode 10 and the insulating film 7. Then, a planarizing layer 12 is formed of a photosensitive acrylic resin on the surface of the insulating interlayer 11 by coating. Pixel electrodes 4 are formed of ITO, IZO, or the like on the surface of the planarizing layer 12 by sputtering. Subsequently, a passivation layer 13 is formed of SiO2, SiN, or the like over the surfaces of the pixel electrodes 4. Then, a common electrode 5 is formed of ITO, IZO, or the like on the surface of the passivation layer 13 by sputtering. An alignment layer 14 is formed of an organic material such as polyimide over the surfaces of the common electrode 5 and the passivation layer 13 by coating. Step S1 of forming TFTs is thus completed.

Figure 6:
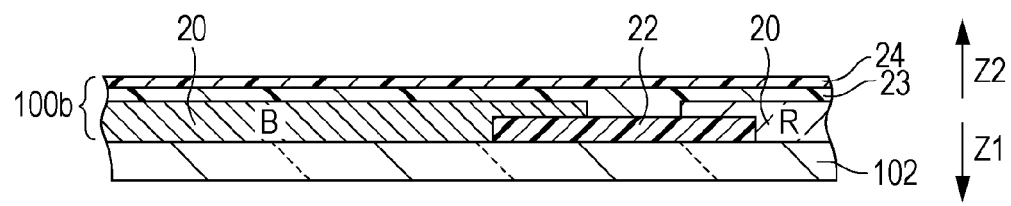
FIG. 6 is a sectional view showing the step of forming color filters in the manufacturing process of the liquid crystal panel according to the first embodiment.

Turning to Step S2 shown in FIG. 4 of forming color filters (CFs), a black resign layer is formed over the surface of a large mother CF substrate 102. The resin layer is etched to form a black matrix (BM) 22, as shown in FIG. 6. Then, red (R), green (G) and blue (B) color filters (CFs) 20 are formed on the surfaces of the mother CF substrate 102 and the black matrix 22 by photolithography.

An overcoat layer (OC) 23 is formed to cover the color filters 20 and the black matrix 22 by coating. In this instance, the overcoat layer 23 covers substantially entire surfaces of the black matrix 22 and the color filters 20.

An alignment layer 24 is formed of an organic material such as polyimide on the surface of the overcoat layer 23. Thus the Step S2 of forming color filters is completed.

Figure 7:
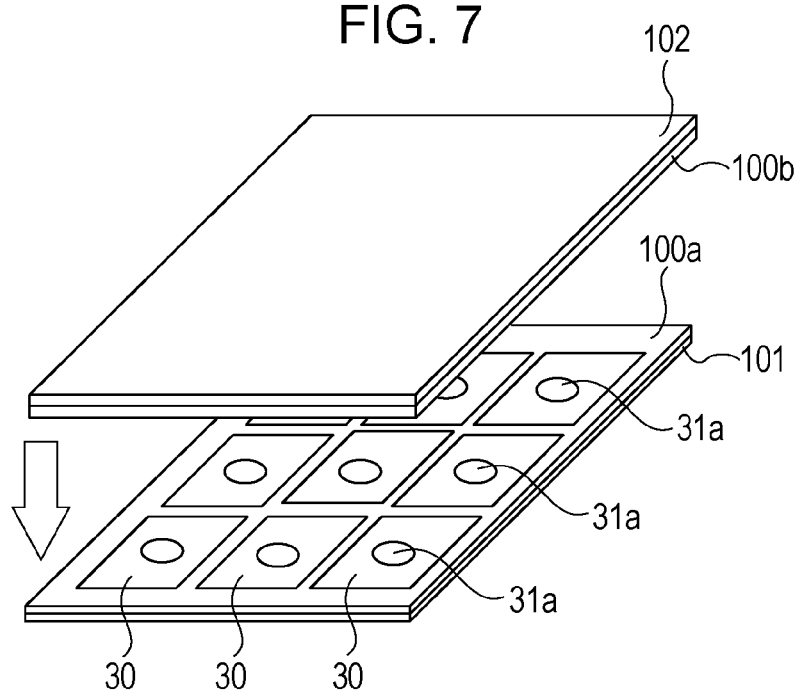
FIG. 7 is a representation of an ODF method (step of dropping a liquid crystal) in the manufacturing process of the liquid crystal panel according to the first embodiment.
Figure 8:
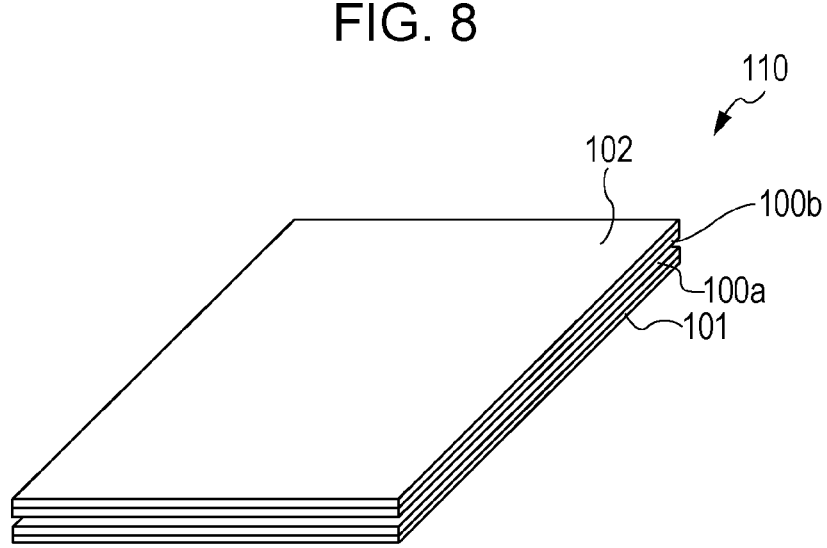
FIG. 8 is a representation of an ODF method (step of combining substrates in a vacuum) in the manufacturing process of the liquid crystal panel according to the first embodiment.

Subsequently, an ODF (One Drop Fill) method is performed. More specifically, in Step S3 shown in FIG. 4, a sealant 30 is applied onto the surface of the TFT substrate 101 in rectangular shapes as shown in FIG. 7 with a dispenser, and a liquid crystal 31a is dropped inside the rectangular coatings of the sealant 30. The TFT substrate 101 and the CF substrate 102 are combined in a vacuum in Step S4 in the ODF method, thereby forming a combined substrate 110, as shown in FIG. 8.

Figure 9:
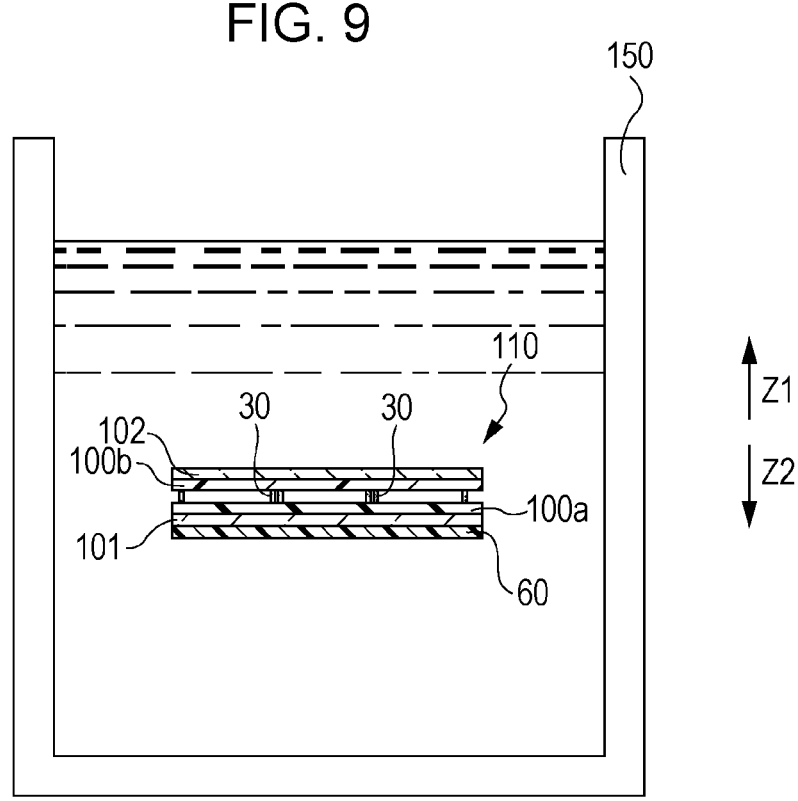
FIG. 9 is a representation of the step of reducing a thickness in the manufacturing process of the liquid crystal panel according to the first embodiment.
Figure 10:
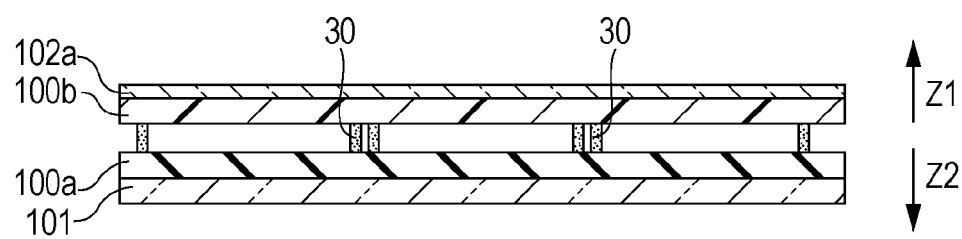
FIG. 10 is a representation of the step of reducing the thickness in the manufacturing process of the liquid crystal panel according to the first embodiment.

Then, in Step S5 shown in FIG. 4, the thickness of the combined substrate 110 is reduced by etching (chemically polishing) the surface in the Z1 direction of the CF substrate 102, as shown in FIG. 9. More specifically, a resist layer 60 is formed on the surface in the Z2 direction of the TFT substrate 101 of the combined substrate 110 to prevent this surface from being etched. Then, the combined substrate 110 is immersed in a hydrofluoric acid-based etchant in a vessel 150. After a predetermined time has elapsed, the combined substrate 110 is taken out of the vessel 150. As a result, the thickness of the CF substrate 102 is reduced to obtain a thinned CF substrate 102a without reducing the thickness of the TFT substrate 101, as shown in FIG. 10. In this step, the thickness of the CF substrate 102 (102a) is reduced to about 100 μm from about 600 μm.

Figure 11:
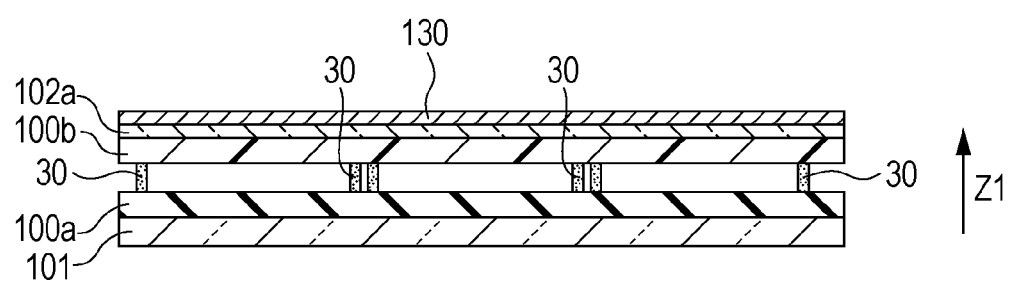
FIG. 11 is a sectional view showing the step of forming a parallax barrier layer in the manufacturing process of the liquid crystal panel according to the first embodiment.
Figure 12:
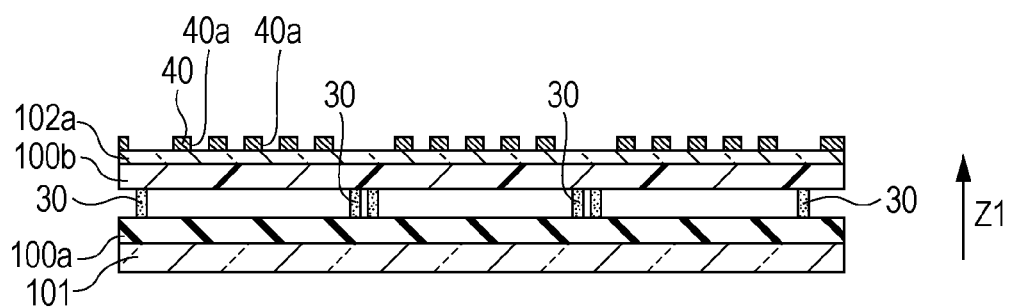
FIG. 12 is a sectional view showing the step of patterning in the manufacturing process of the liquid crystal panel according to the first embodiment.
Figure 13:
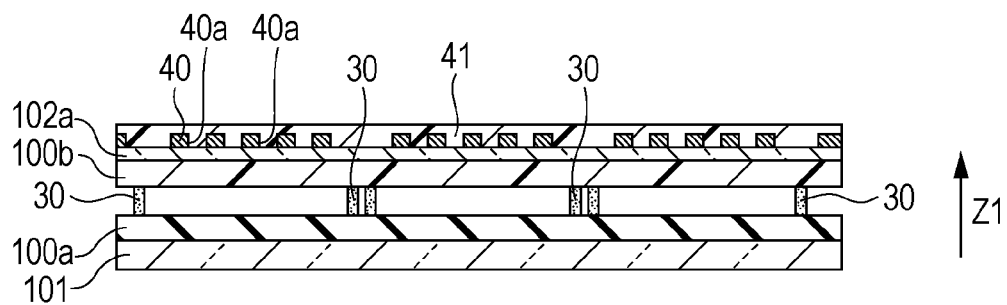
FIG. 13 is a sectional view showing the step of forming a protective film in the manufacturing process of the liquid crystal panel according to the first embodiment.
Figure 14:
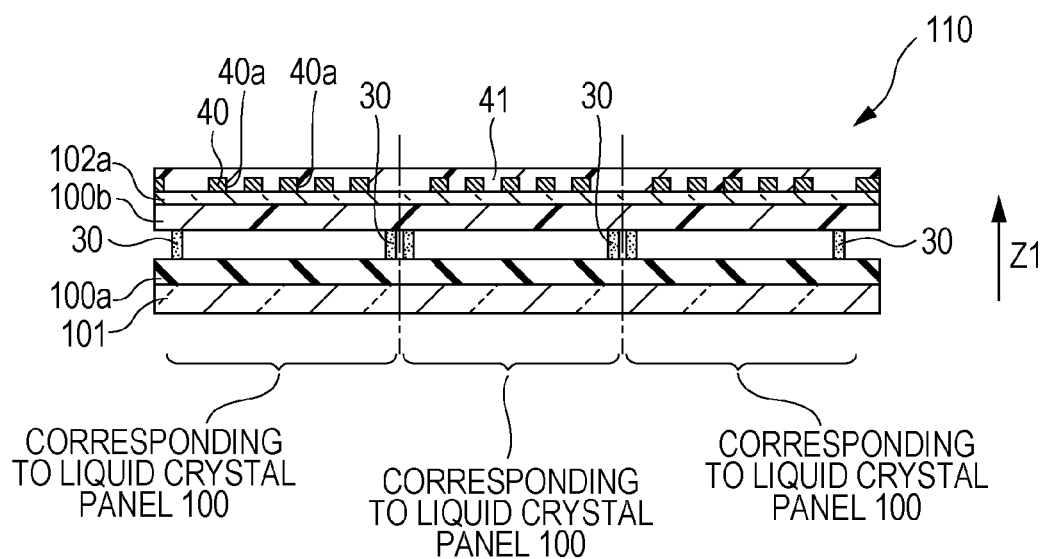
FIG. 14 is a sectional view showing the step of cutting in the manufacturing process of the liquid crystal panel according to the first embodiment.

Then, in Step S6 shown in FIG. 4, a parallax barrier layer is formed by depositing a Cr metal layer 130 on the surface in the Z1 direction of the thinned CF substrate 102a by sputtering or vapor deposition, as shown in FIG. 11. Subsequently, in Step S7 shown in FIG. 4, a resist pattern is formed by photolithography on the portion of the metal layer 130 that is to act as the parallax barrier pattern 40. The metal layer 130 is etched to form openings 40a, and the resist pattern is removed. Thus the parallax barrier pattern 40 having the openings 40a is formed as shown in FIG. 12. Turning to FIG. 13, a protective film 41 of an acrylic resin is formed over the surface of the parallax barrier pattern 40 by coating. Then, in Step S8 shown in FIG. 4, the combined substrate 110 is cut into a plurality of units of the liquid crystal panel 100, as shown in FIG. 14.

Subsequently, a polarizer 42 is bonded to the surface of the protective film 41 of the CF substrate 2 of the unit with an adhesive (not shown), as shown in FIG. 1, in Step S9 shown in FIG. 4. Also, another polarizer 15 is formed on the surface in the Z2 direction of the TFT substrate 1 of the unit with an adhesive. Subsequently, in Step S10 shown in FIG. 4, other devices, such as a driver (not shown) driving the liquid crystal panel 100 and a backlight 80, are provided to the unit. Thus the liquid crystal panel 100 is completed.

In the first embodiment, the parallax barrier pattern 40 is disposed directly on the surface of the CF substrate 102 opposite to the side holding the liquid crystal layer 31, as described above. This structure can prevent foreign matter from being trapped between the CF substrate 102 and the parallax barrier pattern 40, unlike the case where, for example, the parallax barrier pattern 40 is bonded to the surface of the CF substrate 102 with an adhesive layer therebetween. Consequently, the reduction of the yield of the liquid crystal panel 100 can be prevented. If the parallax barrier pattern 40 is bonded to the CF substrate with an adhesive layer therebetween, air bubbles as well as foreign matter may enter the adhesive layer. Such an event does not occur in the structure of the present embodiment, and the reduction of the yield of the liquid crystal panel 100 can be prevented. In addition, the structure of the first embodiment can prevent the reduction of the yield caused by the adhesive layer running out of the parallax barrier pattern 40 and damaging, for example, the terminal of the liquid crystal panel 100, or by contamination with a component of the adhesive layer.

Furthermore, by forming the parallax barrier pattern 40 directly on the surface of the thinned CF substrate 102 opposite to the side holding the liquid crystal layer 31, the distance between the parallax barrier pattern 40 and the color filters 20 can be reduced. Also, unlike the case where the parallax barrier pattern 40 is bonded to the surface of the CF substrate with an adhesive layer, it is not necessary to control the thickness of the adhesive layer. This remarkably enhances the precision of the distance between the parallax barrier pattern 40 and the color filters 20.

In the first embodiment, the liquid crystal layer 31 is disposed between the TFT substrate 101 and the CF substrate 102 by dropping a liquid crystal onto the surface of the TFT substrate 101, as described above. This can prevent air from being trapped between the TFT substrate 101 and the CF substrate 102. Consequently, even if the combined substrate 110 is in a vacuum or at a high temperature in the step of forming the parallax barrier pattern 40 on the surface of the CF substrate 102, the combined substrate 110 is not ruptured by air expanded between the TFT substrate and the CF substrate.

In the first embodiment, the TFT substrate 101 and the CF substrate 102 are combined after dropping the liquid crystal 31a and before reducing the thickness of the CF substrate 102 and forming the parallax barrier pattern 40. This can prevent air from being trapped between the TFT substrate 101 and the CF substrate 102, as described above. Consequently, even if the combined substrate 110 is in a vacuum or at a high temperature in the step of forming the parallax barrier pattern 40, the combined substrate 110 is not ruptured by air expanded between the TFT substrate and the CF substrate.

In the first embodiment, a resin protective film 41 is formed on the surface of the parallax barrier pattern 40, and a polarizer 42 is disposed on the surface of the protective film 41, as described above. Since the resin protective film 41 can planarize the surface of the parallax barrier pattern 40, the polarizer 42 can be formed on the resulting flat surface of the protective film 41. Consequently, the surface of the polarizer 42 can be prevented from bending. Also, since the parallax barrier pattern 40 is covered with the protective film 41, the protective film 41 prevents the polarizer 42 from coming into direct contact with the parallax barrier pattern 40.

In the first embodiment, the parallax barrier pattern 40 is formed by forming a metal layer 130 on the surface of the thinned CF substrate 102a opposite to the side holding the liquid crystal layer 31 by sputtering and then patterning the metal layer 130, as described above. This method can easily form the parallax barrier pattern 40 directly on the surface of the thinned CF substrate 102a opposite to the side holding the liquid crystal layer 31.

Second Embodiment

A second embodiment will now be described with reference to FIG. 1 and FIGS. 15 to 19. In the second embodiment, the liquid crystal 31a is injected by vacuum injection after forming the parallax barrier pattern 40 on the surface of the thinned CF substrate 102a, unlike the first embodiment in which the liquid crystal 31a is dropped in the ODF method before forming the parallax barrier pattern 40 on the surface of the CF substrate 102 and forming the combined substrate 110 in a vacuum in the ODF method. The liquid crystal panel 200 of the second embodiment has the same structure as the liquid crystal panel 100 of the first embodiment.

Figure 15:
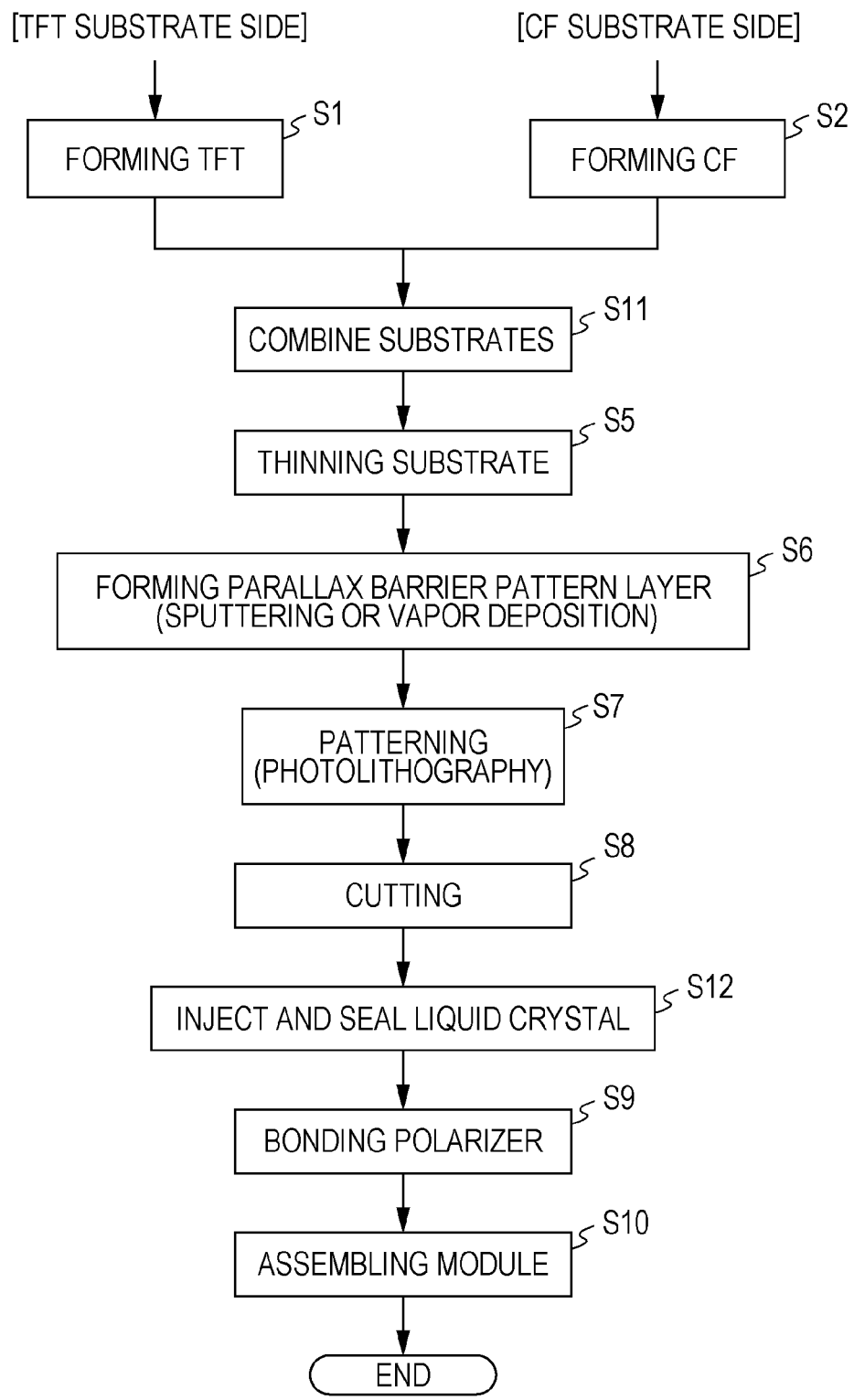
FIG. 15 is a flow chart of a manufacturing process of a liquid crystal panel according to a second embodiment.

In the manufacturing process of the liquid crystal panel 200 (see FIG. 1) of the second embodiment, TFTs are formed on a large mother TFT substrate 101 (see FIG. 16) in Step S1 shown in FIG. 15 in the same manner as in the first embodiment. The liquid crystal panel 200 is one form of the liquid crystal display device of the present invention. In Step S2, color filters 20 are formed on a large mother CF substrate 102 (see FIG. 16) in the same manner as in the first embodiment.

Figure 17:
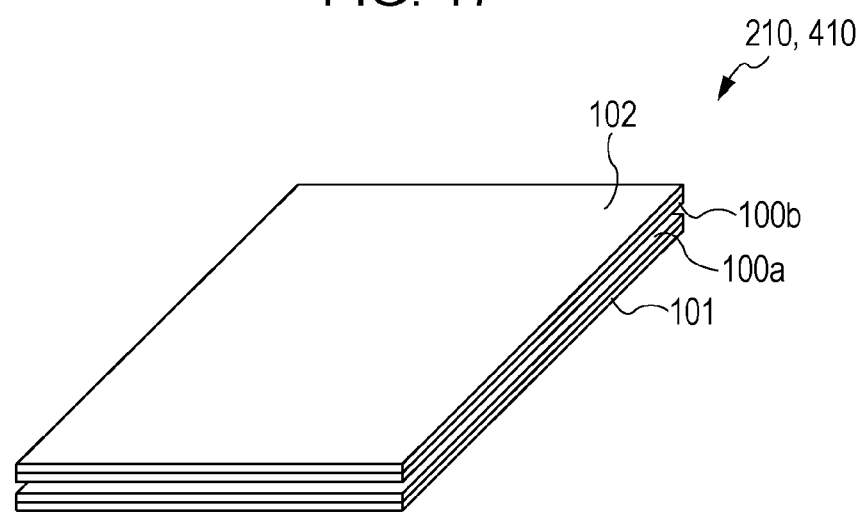
FIG. 17 is a representation of the step of combining substrates in the manufacturing process of the liquid crystal panel according to the second embodiment.

Then, in Step S11 shown in FIG. 15, a sealant 30 is applied onto the surface of the TFT substrate 101 with a dispenser or the like for ensuring a space into which a liquid crystal 31a is to be injected in a subsequent step. Then, the TFT substrate 101 and the CF substrate 102 are pressed together to form a combined substrate 210, as shown in FIG. 17.

Subsequently, as shown in FIG. 15, the thickness of the CF substrate 102 is reduced by chemical etching in Step S5 in the same manner as in the first embodiment. Then, in Step S6, a parallax barrier layer is formed by depositing a metal layer 130 on the surface in the Z1 direction of the CF substrate 102 by sputtering or vapor deposition. The metal layer 130 is patterned by photolithography and etching in Step S7. Then, the combined substrate 210 is cut into units of the liquid crystal panel 200 in Step S8.

In the second embodiment, subsequently, a liquid crystal 31a is injected and sealed in a step S12. More specifically, the combined substrate 210 is placed in a vacuum, and the liquid crystal 31a is injected through a gap in the sealant 30 applied to the combined substrate 210, as shown in FIG. 18. After injecting the liquid crystal 31a, the gap in the sealant 30 is sealed with a resin sealing compound 50, as shown in FIG. 19. Then, a resin flat protective film 41 is formed on the surface in the Z1 direction of the parallax barrier pattern 40, as shown in FIG. 1, by coating in the same manner as in the first embodiment. Then, in Step S9, a polarizer 42 is bonded to the surface in the Z1 direction of the protective film 41, and another polarizer 15 is bonded to the surface in the Z2 direction of the TFT substrate 1. Subsequently, other devices, such as a driver (not shown) driving the liquid crystal panel 200 and a backlight 80, are provided to the unit in Step S10, and thus the liquid crystal panel 200 (see FIG. 1) is completed.

The other steps in the manufacturing process of the liquid crystal panel 200 of the second embodiment are performed in the same manner as in the first embodiment.

In the second embodiment, the liquid crystal 31a is injected into the combined substrate 210 after reducing the thickness of the CF substrate 102 and forming the parallax barrier pattern 40, as described above. Consequently, the liquid crystal layer 31 can be easily provided in the combined substrate 210 having the parallax barrier pattern 40 by vacuum injection.

The second embodiment can produce the same effects as the first embodiment in addition to the above effect.

Third Embodiment

Figure 20:
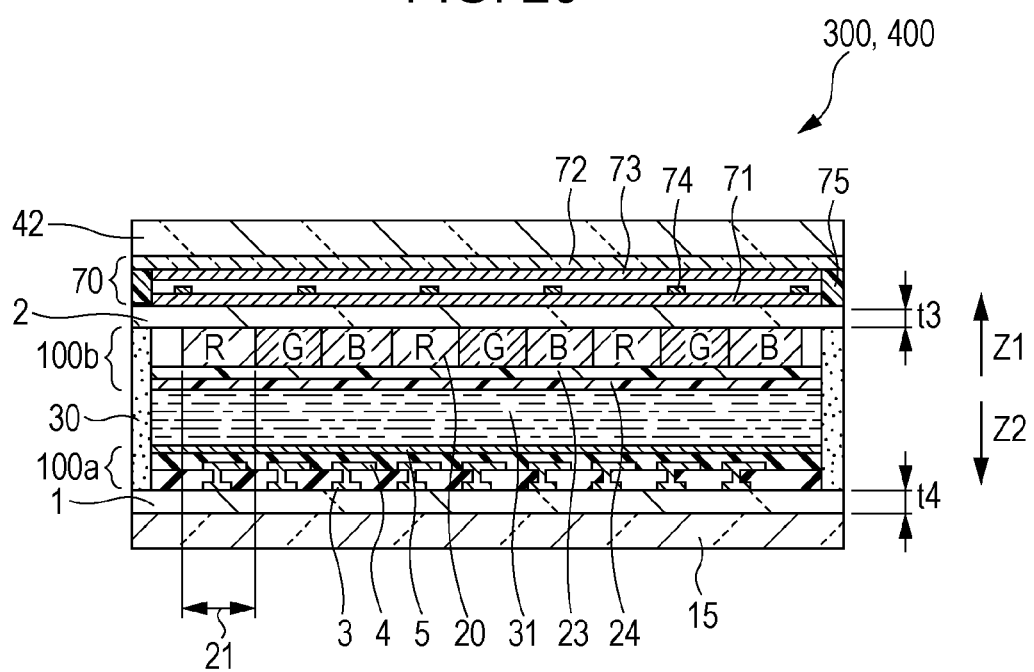
FIG. 20 is a sectional view of a liquid crystal panel having a touch panel pattern according to a third embodiment.

Turning now to FIG. 20, a third embodiment will be described below. In the third embodiment, the thicknesses of both the TFT substrate 101 and the CF substrate 102 are reduced, and a touch panel pattern 70 is formed on the thinned CF substrate 102a, unlike the first embodiment in which the parallax barrier pattern 40 is formed on the surface of the thinned CF substrate 102a. The touch panel pattern 70 is a type of the functional member used in the an embodiment.

In the liquid crystal panel 300 according to the third embodiment shown in FIG. 20, the CF substrate 2 has a thickness t3 of about 100 μm, and the TFT substrate 1 has a thickness t4 of about 100 μm. Hence, the CF substrate 1 and the TFT substrate 1 have the same thickness. A layer (transparent electrode film 71) intended for a direct resistive touch panel pattern 70 is disposed on the surface in the Z1 direction of the substrate 2. The liquid crystal panel 300 is one form of the liquid crystal display device of the present invention. More specifically, the transparent electrode film 71 of a transparent electroconductive material, such as ITO (indium tin oxide) is disposed on the surface in the Z1 direction of the CF substrate 2. The transparent electrode film 71 is in a form of thin film. Also, a flexible transparent substrate 72 is disposed to the Z1 direction side of the CF substrate 2 so as to oppose the CF substrate 2. Another transparent electrode film 73 of a transparent electroconductive material, such as ITO, is disposed on the surface in the Z2 direction of the transparent substrate 72.

Photosensitive spacers 74 made of, for example, an acrylic resin are disposed at predetermined intervals on the surface in the Z1 direction of the transparent electrode film 71. The CF substrate 2 and the transparent substrate 72 are bonded together with a sealant 75 made of, for example, a resin. Also, a polarizer 42 is disposed on the surface in the Z1 direction of the transparent substrate 72.

The touch panel pattern 70 is configured so that not only the transparent substrate 72 but also the transparent electrode film 73 is bent by pressing the transparent substrate 72 (polarizer 42). When the transparent electrode films 71 and 73 come into contact with each other, they are electrically connected at the contact point. By detecting the contact point with a detector (not shown), the observer can know which position of the touch panel pattern 70 has been pressed.

Figure 26:
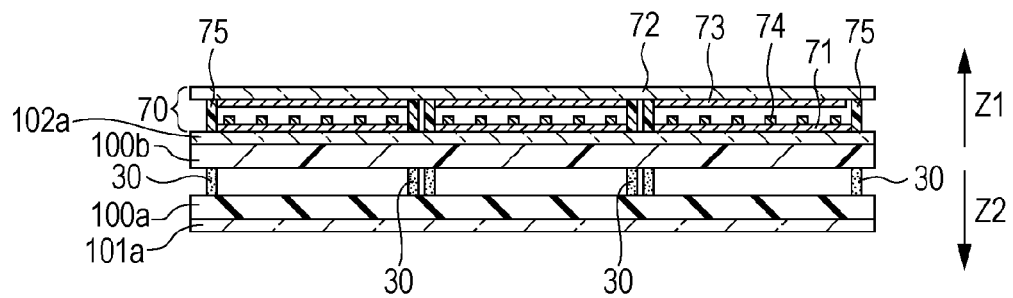
FIG. 26 is a representation of the step of forming the touch panel pattern in the manufacturing process of the liquid crystal panel according to the third embodiment.

A manufacturing process of the liquid crystal panel 300 according to the third embodiment will now be described with reference to FIG. 20 and FIG. 26. In the third embodiment, a process will be described in which the touch panel pattern 70 is formed on the surface in the Z1 direction of the thinned CF substrate 102a by an ODF method as in the first embodiment.

Figure 21:
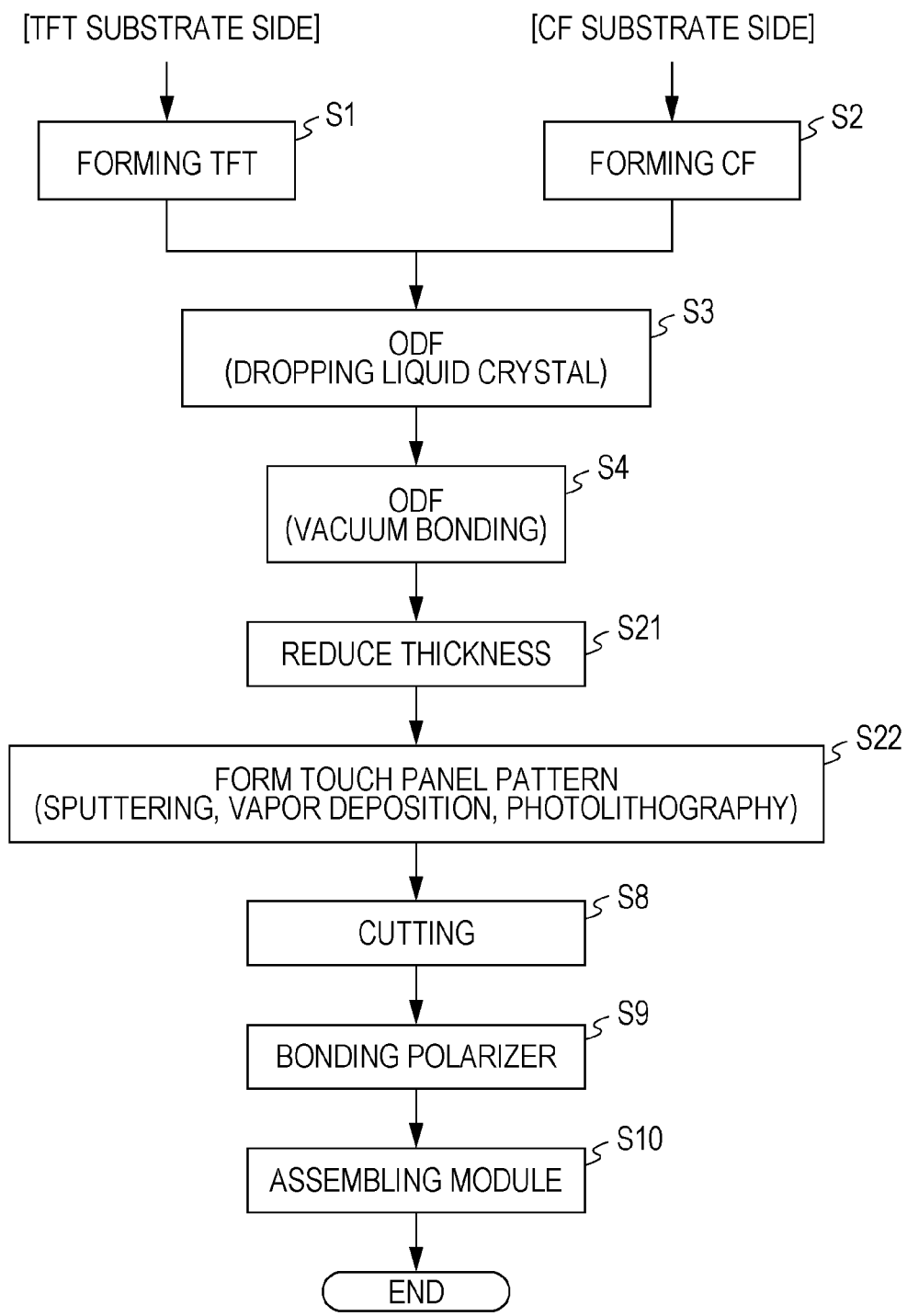
FIG. 21 is a flow chart of a manufacturing process of the liquid crystal panel according to the third embodiment.
Figure 22:
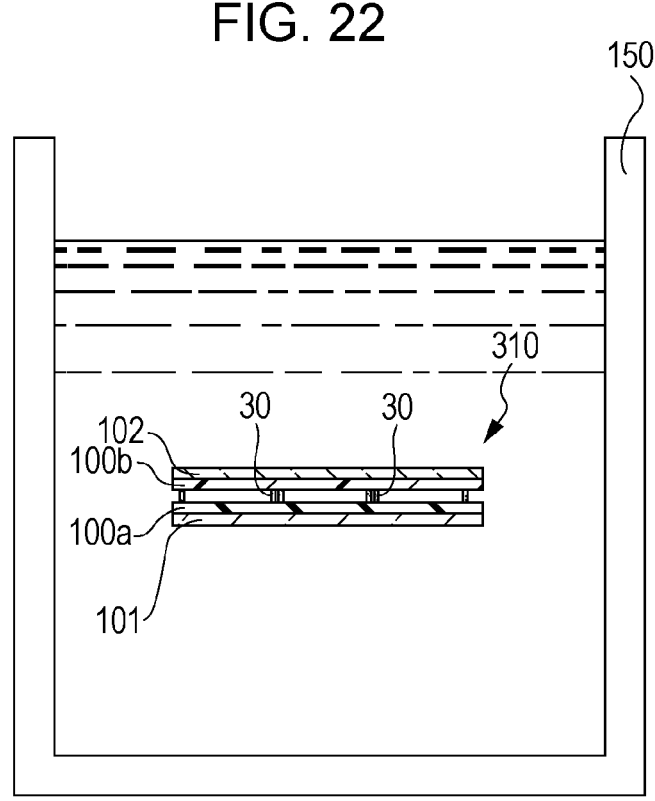
FIG. 22 is a representation of the step of reducing a thickness in the manufacturing process of the liquid crystal panel according to the third embodiment.
Figure 23:
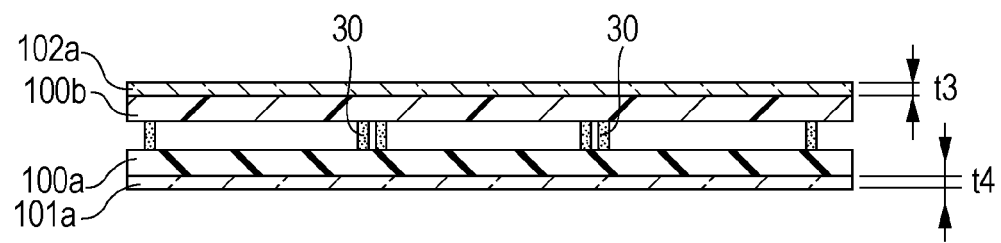
FIG. 23 is a representation of the step of reducing the thickness in the manufacturing process of the liquid crystal panel according to the third embodiment.

As shown in FIG. 21, in the third embodiment, the TFT substrate 101 and the CF substrate 102 are combined to form a combined substrate 310 shown in FIG. 22 through the Steps S1 to S4 of forming TFTs, forming color filters, dropping a liquid crystal in an ODF method, and combining the substrates in a vacuum in the ODF method, as in the first embodiment. The combined substrate 310 is immersed in a hydrofluoric acid-based etchant in a vessel 150 in Step S21, as shown in FIG. 22. After a predetermined time has elapsed, the combined substrate 310 is taken out of the vessel 150. As a result, the thicknesses of the TFT substrate 101 and the CF substrate 102 are reduced to obtain a thinned TFT substrate 101a and a thinned CF substrate 102a, as shown in FIG. 23. In this step, the thicknesses of the TFT substrate 101 (101a) and the CF substrate 102 (102a) are each reduced to about 100 μm from about 600 μm.

Figure 24:
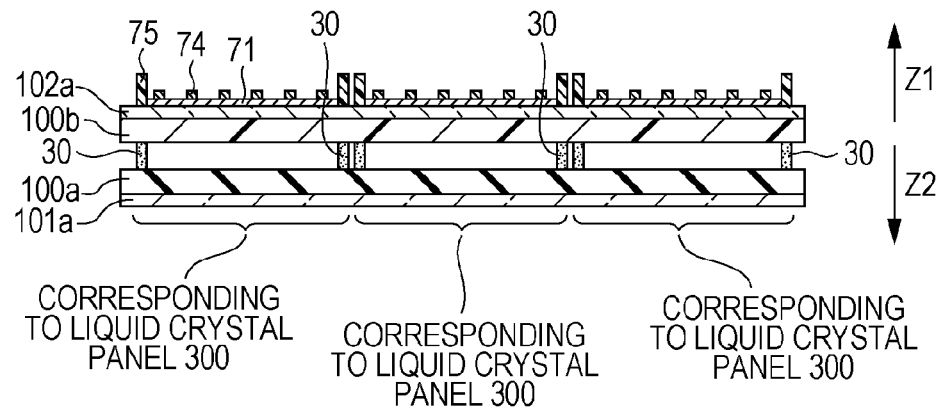
FIG. 24 is a representation of the step of forming a touch panel pattern in the manufacturing process of the liquid crystal panel according to the third embodiment.
Figure 25:
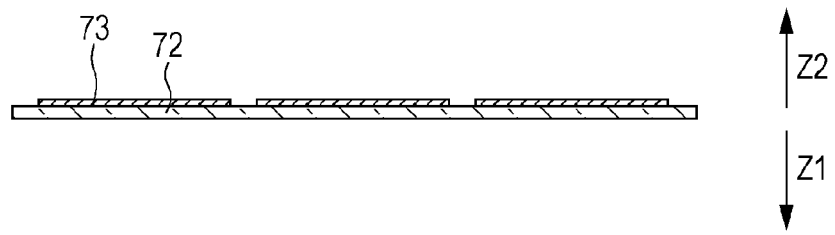
FIG. 25 is a representation of the step of forming the touch panel pattern in the manufacturing process of the liquid crystal panel according to the third embodiment.

In the third embodiment, a touch panel pattern is then formed in Step S22 shown in FIG. 21. More specifically, a transparent electroconductive layer for the transparent electrode film 71 is deposited directly on the surface in the Z1 direction of the thinned CF substrate 102a by sputtering or vapor deposition, as shown in FIG. 24. The transparent electroconductive layer is patterned so as to correspond to a plurality of liquid crystal panels 300 by photolithography and etching to form transparent electrode films 71. Then, spacers 74 are formed of, for example, a resin at predetermined intervals on the surfaces of the transparent electrode films 71 by photolithography. Also, a sealant 75 is applied on the surface in the Z1 direction of the thinned CF substrate 102a for bonding the CF substrate 102a and the transparent substrate 72 together. Further, transparent electrode films 73 are formed on the surface in the Z2 direction of the transparent substrate 72 by sputtering or vapor deposition, as shown in FIG. 25. Turning to FIG. 26, the CF substrate 102a and the surface in the Z2 direction of the transparent substrate 72 are bonded together with the sealant 75 therebetween, thereby forming the touch panel pattern 70. Subsequently, as shown in FIG. 21, the resulting structure is worked into liquid crystal panels 300 shown in FIG. 20 through cutting in Step S8, bonding a polarizer in Step S9 and assembling modules in Step S10, as in the first embodiment.

The other steps in the manufacturing process of the liquid crystal panel 300 of the third embodiment are performed in the same manner as in the first embodiment.

In the third embodiment, the touch panel pattern 70 is disposed directly on the surface of the CF substrate 102 opposite to the side holding the liquid crystal layer 31, as described above. This structure can prevent foreign matter from being trapped between the CF substrate 102 and the touch panel pattern 70, unlike the case where, for example, the touch panel pattern 70 is bonded to the surface of the CF substrate 102 with an adhesive layer therebetween. Consequently, the reduction of the yield of the liquid crystal panel 300 can be prevented.

The third embodiment can produce the same effects as the first embodiment in addition to the above effect.

Fourth Embodiment

A fourth embodiment will now be described with reference to FIGS. 16 and 17 and FIGS. 20 to 27. In the fourth embodiment, a liquid crystal 31a is injected after the touch panel pattern 70 has been formed on the surface of the CF substrate 102 by vacuum injection used in the second embodiment, unlike the third embodiment in which the combined substrate 310 is formed by combining the substrates in a vacuum in the ODF method after dropping a liquid crystal in the ODF method, before the touch panel pattern 70 is formed on the surface of the CF substrate 102. The liquid crystal panel of the fourth embodiment has the same structure as the liquid crystal panel 300 of the third embodiment.

Figure 27:
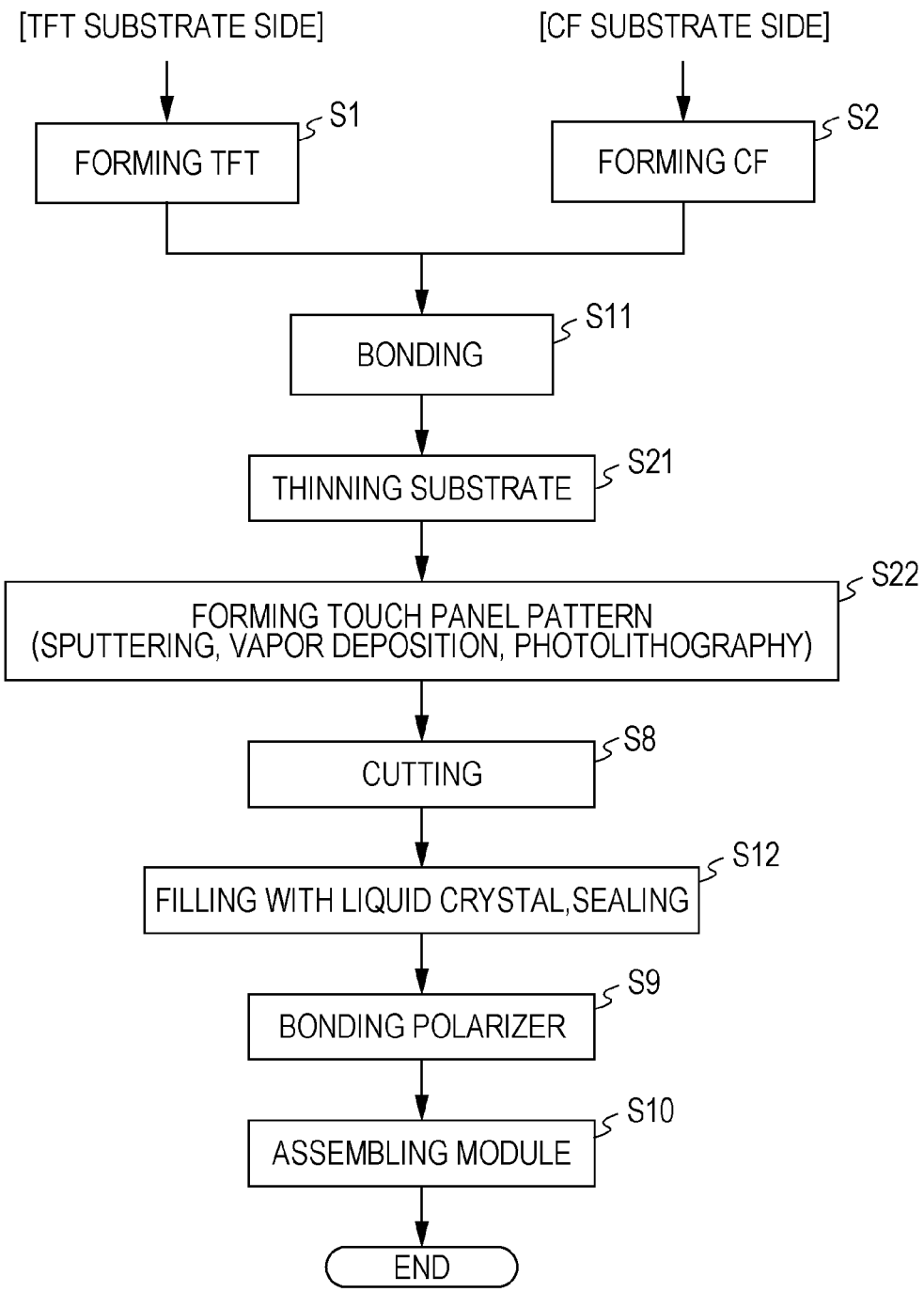
FIG. 27 is a flow chart of a manufacturing process of a liquid crystal panel according to a fourth embodiment.

In the manufacturing process of the liquid crystal panel 400 (see FIG. 20) according to the fourth embodiment, TFTs are formed on a large mother TFT substrate 101 in Step S1, as in the third embodiment, and color filters are formed on a large mother CF substrate 102 in Step S2, as shown in FIG. 27.

Figure 16:
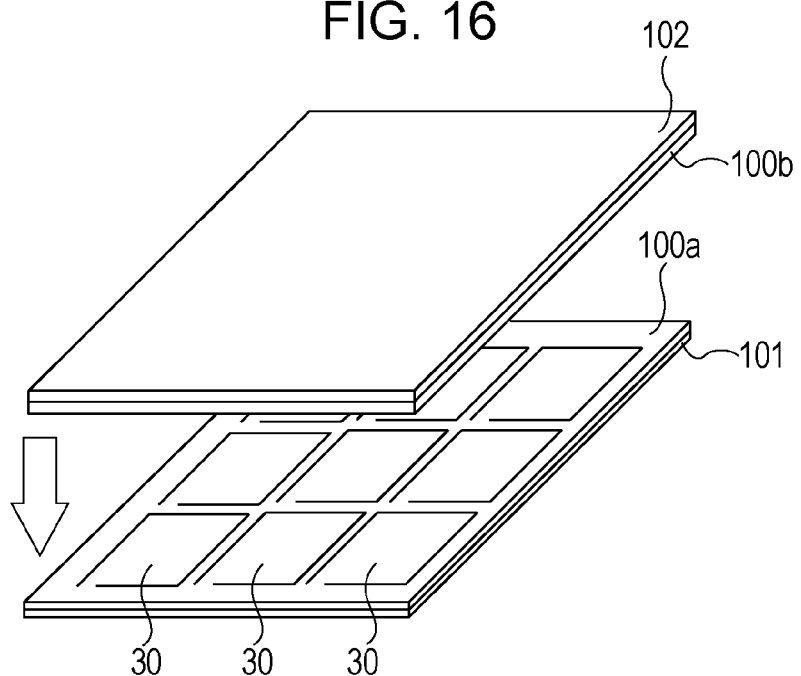
FIG. 16 is a representation of the step of combining substrates in the manufacturing process of the liquid crystal panel according to the second embodiment.

Turning to Step S11, a combined substrate 410 shown in FIG. 17 is prepared by applying a sealant 30 over the CF substrate 101 as shown in FIG. 16 and pressing the CF substrate 101 and the TFT substrate 102 together in the same manner as in the second embodiment. Subsequently, the thicknesses of the TFT substrate 101 and the CF substrate 102 of the combined substrate 410 are reduced in Step S21 by chemical etching in the same manner as in the third embodiment. Turning to Step S22, the touch panel pattern 70 is formed directly on the thinned CF substrate 102a by sputtering or vapor deposition. The combined substrate 410 having the touch panel pattern 70 is cut into units of the liquid crystal panel 400 in Step S8.

Then, in Step S12, a liquid crystal is injected into the combined substrate 410 by vacuum injection in the same manner as in the second embodiment. The inlet for the liquid crystal of the combined substrate 410 is sealed with a resin sealing compound by photolithography. Then, a polarizer 42 is bonded to the surface of the touch panel pattern 70 with an adhesive in Step S9 in the same manner as in the third embodiment. Subsequently, other devices, such as a driver (not shown) driving the liquid crystal panel 400 and a backlight 80, are provided to the unit in Step S10, and thus the liquid crystal panel 400 is completed as shown in FIG. 20.

In the fourth embodiment, the liquid crystal 31a is injected into the combined substrate 410 after reducing the thickness of the CF substrate 102 and forming the touch panel pattern 70, as described above. Consequently, the liquid crystal layer 31 can be easily provided in the combined substrate 410 having the touch panel pattern 70 by vacuum injection.

The fourth embodiment can produce the same effects as the third embodiment in addition to the above effect.

While the present invention has been described with reference to exemplary embodiments, it is to be understood that the invention is not limited to the disclosed exemplary embodiments. The scope of the invention is specified in the appended claims, and various modifications may be made within the scope and spirit equivalent to the claims.

For example, the parallax barrier pattern or the touch panel pattern is not typically disposed on the surface of the CF substrate opposite to the liquid crystal layer, unlike the structures of the first to fourth embodiments. The parallax barrier pattern or the touch panel pattern may be disposed directly on the surface of the TFT substrate opposite to the liquid crystal layer. Although in the first and the second embodiment, the TFT substrate is disposed at the opposite side more distant from the user (the CF substrate is disposed at the user side), the parallax barrier pattern may be disposed at the user side or the opposite side. Hence, the parallax barrier pattern may be provided to the TFT substrate distant from the user in the first and the second embodiment, or the TFT substrate having the parallax barrier pattern may be disposed at the user side, unlike the first embodiment or the second embodiment. The parallax barrier pattern disposed at the user side, as in the first and second embodiments can block light emitted from the pixels more than the case where it is disposed at the opposite side, highly exhibiting the desired function. Thus, it can reduce the color mixture due to light from the adjacent pixels. On the other hand, the parallax barrier pattern disposed at the opposite side, unlike the first or the second embodiment can prevent a so-called moire pattern, which is a phenomenon caused by interference of light, more effectively than the parallax barrier pattern disposed at the user side.

Although the first and the second embodiment each describe a manufacturing process for producing a vertical electric field liquid crystal panel, another embodiment may provide a lateral electric field liquid crystal display device.

Although in the first to fourth embodiments, a parallax barrier pattern or a touch panel pattern is used as a functional member, the functional member is not limited to these patterns. For example, in a lateral electric field liquid crystal panel, an electroconductive shield layer may be formed as a functional member directly on the surface of the liquid crystal panel. The electroconductive shield layer can protect the device from external static electricity and can act as an electrostatic shield discharging the charge stored at the CF substrate side.

Although the parallax barrier pattern of the first and the second embodiment has a plurality of openings therein, it is not limited to such a form. For example, the parallax barrier pattern may have a checked pattern or a plurality of circular openings when viewed from above.

Although in the third and the fourth embodiment, a resistive touch panel pattern is used as a functional member, the functional member is not limited to such a pattern. For example, the functional member may be a capacitance touch panel pattern configured for touch input so as to detect changes in capacitance caused by touching an electroconductive film formed on the surface of a substrate.

Although in the first to fourth embodiments, the step of reducing the thickness is performed by chemical etching (chemical polishing), it is not limited to such a technique. For example, the thickness may be reduced by mechanical polishing.

Although in the first and the second embodiment, the parallax barrier pattern is formed by patterning a parallax barrier layer (metal layer) deposited on the surface of the CF substrate by sputtering or vapor deposition, the formation of the parallax barrier pattern is not limited to this method. Any method other than sputtering and vapor deposition can be applied to form a parallax barrier layer (metal layer), as long as the parallax barrier layer can be formed directly on the surface of the CF substrate.

Although in the first and the second embodiment, a metal parallax barrier layer is formed for the parallax barrier pattern 40, the material of the parallax barrier layer is not limited to a metal. For example, the parallax barrier layer may be formed of a light-shielding resin without being limited to a metal. Since the reflection of external light from a resin parallax barrier pattern can be lower than that from the metal pattern, the user can easily observe images displayed on the liquid crystal display device. For forming such a resin parallax barrier pattern, it can be formed of a photosensitive resin by a common process, such as photolithography. In this instance, the resin layer is placed under a very high-temperature condition for firing or the like. The resin parallax barrier pattern can be used advantageously in an embodiment of the invention.

Although in the third and the fourth embodiment, the transparent electrode film of the touch panel pattern is deposited directly on the surface of the CF substrate by sputtering or vapor deposition, the formation of the touch panel pattern is not limited to this method. The transparent electrode film can be formed even by any method other than sputtering or vapor deposition, as long as it can be formed directly on the surface of the CF substrate.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A method for manufacturing a liquid crystal display device, comprising the steps of:
    combining a first substrate and a second substrate between which a liquid crystal layer is to be held; and
    forming a functional member including a parallax barrier pattern having a plurality of openings directly on a surface of the first substrate opposite to the side holding the liquid crystal layer, wherein the parallax barrier pattern is formed by depositing an opaque metal layer directly on the surface of the first substrate and patterning the metal layer to form the plurality of openings after the step of combining the first and the second substrates.

2. The method according to claim 1, wherein the opaque metal layer includes a Cr metal layer.

3. The method according to claim 1, further comprising the step of dropping a liquid crystal onto one of the first substrate and the second substrate before the step of forming the functional member.

4. The method according to claim 1, further comprising the step of reducing the thickness of the first substrate before the step of forming the functional member.

5. The method according to claim 4, further comprising the step of dropping a liquid crystal onto one of the first substrate and the second substrate before the step of reducing the thickness.

6. The method according to claim 4, further comprising the steps of:
    forming a color filter on the side of the first substrate holding the liquid crystal layer; and
    forming a thin film transistor on the side of the second substrate holding the liquid crystal layer,
    wherein the step of reducing the thickness is performed on the surface of the first substrate opposite to the side holding the liquid crystal layer.

7. The method according to claim 4, further comprising the step of dropping a liquid crystal onto one of the first substrate and the second substrate before the steps of reducing the thickness and forming the functional member.

8. The method according to claim 7, wherein the step of combining the first substrate and the second substrate is performed after the step of dropping the liquid crystal and before the step of reducing the thickness.

9. The method according to claim 4, further comprising the step of injecting a liquid crystal into a space between the first substrate and the second substrate after the steps of reducing the thickness and forming the functional member.

10. The method according claim 1, further comprising the steps of forming a protective film on a surface of the functional member; and disposing a polarizer on a surface of the protective film.

11. The method according to claim 1, wherein the Cr metal layer is formed by sputtering or vapor deposition.

12. The method according to claim 11, wherein the parallax barrier pattern is formed by fowling a parallax barrier layer on the surface of the first substrate opposite to the side holding the liquid crystal layer by sputtering or vapor deposition, and patterning the parallax barrier layer into the parallax barrier pattern.

* * * * *